(12) United States Patent
Kim (10) Patent No.: US 7,611,800 B2
(45) Date of Patent: Nov. 3, 2009

(54) BATTERY MODULE

(75) Inventor: Tae-Yong Kim, Yongin-si (KR)

(73) Assignee: Samsung Mobile Display Co., Ltd. (KR)

( * ) Notice: Subject to any disclaimer, the term of this patent is extended or adjusted under 35 U.S.C. 154(b) by 99 days.

(21) Appl. No.: 11/699,543

(22) Filed: Jan. 29, 2007

(65) Prior Publication Data

US 2008/0096104 A1 Apr. 24, 2008

(30) Foreign Application Priority Data

Oct. 20, 2006 (KR) ........................ 10-2006-0102429

(51) Int. Cl.
*H01M 2/24* (2006.01)
*H01M 6/42* (2006.01)
(52) U.S. Cl. ...................... 429/158; 429/149
(58) Field of Classification Search ................ 429/149, 429/156, 158, 160, 161
See application file for complete search history.

(56) References Cited

U.S. PATENT DOCUMENTS

| | | | |
|---|---|---|---|
| 6,599,660 | B2 | 7/2003 | Oda et al. |
| 2005/0070164 | A1* | 3/2005 | Mita et al. .................. 439/627 |
| 2005/0196665 | A1 | 9/2005 | Shimizu et al. |

FOREIGN PATENT DOCUMENTS

| | | |
|---|---|---|
| DE | 100 64 648 A1 | 7/2001 |
| JP | 56-015553 | 2/1981 |
| JP | 56-015553 A | 2/1981 |
| JP | H09-63553 A | 3/1997 |
| JP | 10-106533 A | 4/1998 |
| JP | 2000-268793 A | 9/2000 |
| JP | 2001-185102 A | 7/2001 |
| JP | 2001-345088 A | 12/2001 |
| JP | 2005-093283 | 4/2005 |
| KR | 10-2006-0022360 A | 3/2006 |

OTHER PUBLICATIONS

Search Report dated Feb. 8, 2008 for corresponding European patent application No. 07110579.5 in 5 pages.

* cited by examiner

*Primary Examiner*—Patrick Ryan
*Assistant Examiner*—Muhammad Siddiquee
(74) *Attorney, Agent, or Firm*—Knobbe Martens Olson & Bear LLP (57) ABSTRACT

A battery module includes a plurality of unit batteries, each of which includes an electrode assembly having positive and negative electrodes and a separator interposed therebetween, a casing which has an opened top face and stores the electrode assembly, and a cap assembly disposed on top of the casing. The battery module has an interconnection member which interconnects first and second unit batteries out of a plurality of the unit batteries by connecting a lower portion of the first unit battery with an upper portion of the second unit battery. Peripheral portions of the interconnection member are engaged with a recessed portion formed by making a step in the casing of the first unit battery.

17 Claims, 7 Drawing Sheets

BATTERY MODULE

CROSS-REFERENCE TO RELATED APPLICATION

This application claims priority to and the benefit of Korean Patent Application No. 10-2006-0102429 filed in the Korean Intellectual Property Office on Oct. 20, 2006, the entire content of which is incorporated herein by reference.

BACKGROUND

1. Field

The present invention relates to a battery module, and more particularly, to a battery module having an improved interconnection structure.

2. Discussion of the Related Technology

Generally, a battery module includes a few or several tens rechargeable batteries connected to one another. The rechargeable battery can be repeatedly charged and discharged because its chemical and electrical energy conversion is reversible. Recently, more and more mobile wireless electronic products are being developed, and necessity of the rechargeable battery having a high energy density increases as their sizes are miniaturized and their weights are reduced.

Widely used batteries include a nickel-cadmium battery, a nickel-hydrogen battery, a lithium battery, and the like. Particularly, the lithium rechargeable battery has an operation voltage of 3.6 V, which is triple that of the nickel-cadmium battery or the nickel-hydrogen battery, and also has a high energy density per unit weight. Therefore, the lithium rechargeable battery is being rapidly popularized as a power supply of mobile electronic devices. Such a lithium rechargeable battery can be classified into a lithium ion rechargeable battery, a lithium ion polymer battery, and a lithium polymer battery. While the lithium polymer battery is nearly similar to the lithium ion rechargeable battery, electrolyte of the lithium ion rechargeable battery is substituted with polymer. It contributes to flexibility of design in the shape as well as higher safety. A battery module having a plurality of rechargeable batteries described above is generally used.

The discussion in this section is to provide general background information, and does not constitute an admission of prior art.

SUMMARY

One aspect of the invention provides a battery module, which comprises: a first battery unit comprising a first end, a second end and a side surface interconnecting the first and second ends therebetween, the side surface comprising a recess in the vicinity of second end; a second battery unit comprising a first end and a second end, the first and second battery units are arranged such that the second end of the first battery unit faces the second battery unit; and a coupler comprising a central portion and a peripheral portion, the central portion interposed between the first and second battery units, the peripheral portion contacting the recess such that the coupler receives a portion of the first battery unit near the second end thereof.

In the foregoing battery module, the recess may comprise an inwardly retracted portion of the side surface. The second end comprises a second end surface, and wherein the inwardly retracted portion of the side surface may abut the second end surface. The second end comprises a second end surface, wherein the first battery unit may further comprise an interconnecting surface interconnecting the side surface and the second end surface, and wherein the inwardly retracted portion may be connected to the second end surface via the interconnecting surface. The second end and the side surface may define one or more edges therebetween, wherein the one or more edges may form a closed loop, and wherein the recess may be formed along the one or more edges. The second end and the side surface may define one or more edges therebetween, wherein the one or more edges may form a closed loop, and wherein the recess may be in a single closed loop along the closed loop of the one or more edges. The side surface may comprise one or more additional recesses. The first battery unit may comprise a can, which comprises the second end and the side surface, and wherein the can may have a cross-sectional shape selected from the group consisting of generally a circle, an oval, a rectangle and a polygon. The first battery unit may be fixed or bonded to the coupler.

Still in the foregoing battery module, the central portion may comprise a surface contacting the second end, wherein the peripheral portion may generally extend in a direction substantially perpendicular to the surface of the central portion. The peripheral portion may comprise a rim extending from the central portion in a direction substantially perpendicular to the surface of the central portion. The peripheral portion may surround the side surface near the second end. The coupler may comprise one or more additional peripheral portions, wherein each peripheral portion may be integrated with the central portion via an arm. The peripheral portions may generally surround the side surface near the second end of the first battery unit. The second end may comprise a second end surface facing the second battery unit, wherein the side surface may form an outermost contour when viewed toward the second end in a direction perpendicular to the second end surface, and wherein the coupler may not outwardly extend beyond the contour when viewed in the same direction. The contour may be substantially circular with a radius, wherein the central portion of the coupler may have a center, and wherein a distance from the center to a outermost surface of the peripheral portion in a plane perpendicular to the direction is substantially the same as or smaller than the radius.

Another aspect of the invention provides an automobile comprising the foregoing battery module.

Still another aspect of the invention provides a method of making a battery module, which comprises: providing a first battery unit, a second battery unit and a coupler, wherein the first battery unit comprises a first end, a second end and a side surface between the first and second ends, the side surface comprising a recess in the vicinity of second end, wherein second battery unit comprises a first end and a second end, and wherein the coupler comprises a central portion and a peripheral portion; arranging the first and second battery units such that the second end of the first battery unit faces the second battery unit; and arranging the coupler such that the central portion is interposed between the first and second battery units, that the peripheral portion contacts the recess and that the coupler receives a portion of the first battery unit near the second end thereof.

In the foregoing method, the recess may comprise an inwardly retracted portion of the side surface. The second end and the side surface may define one or more edges therebetween, wherein the one or more edges may form a closed loop, and wherein the recess may be in a single closed loop along the closed loop of the one or more edges. The central portion may comprise a surface contacting the second end, wherein the peripheral portion may generally extend in a direction substantially perpendicular to the surface of the central portion. The peripheral portion may comprise a rim extending from the central portion in a direction substantially perpendicular to the surface of the central portion. The coupler may comprise one or more additional peripheral portions, wherein each peripheral portion may be integrated to the central portion via an arm.

An aspect of the invention provides a battery module having a reduced size while an existing output power level is maintained.

An aspect of the invention provides a battery module comprising: a plurality of unit batteries, each of which includes an electrode assembly having positive and negative electrodes and a separator interposed therebetween, a casing which has an opened top face and stores the electrode assembly, and a cap assembly disposed on top of the casing; and an interconnection member which interconnects first and second unit batteries out of a plurality of the unit batteries by connecting a lower portion of the first unit battery with an upper portion of the second unit battery, wherein one end of the interconnection member is combined with a receiving portion formed by making a step in the casing of the first unit battery, and the other end of the interconnection member is combined with the cap assembly of the second unit battery.

The receiving portion may be formed in a lower side surface of the casing of the first unit battery. The receiving portion may include at least a groove. In this case, one end of the interconnection member is combined with the groove using welding. The interconnection member may interconnect the first and second unit batteries with each other while the first and second unit batteries are arranged in a longitudinal direction. The interconnection member may include a side portion combined with the groove and a bottom portion which is connected to the side section and combined with the cap assembly of the second unit battery. The grooves may be separated from one another at a predetermined interval. In addition, four grooves may be provided in the receiving portion, and the grooves may be separated from one another at the same interval.

Four side portions may be combined with four grooves. The thickness of the side portion may be equal to a depth of the groove. Otherwise, the thickness of the side portion may be smaller than a depth of the groove. The side portion may be combined with the groove using welding, and the bottom portion may be combined with the cap assembly using welding. The welding may include resistance welding or laser welding. The receiving portion may include a step portion formed by making a step in a radius direction along a lower side circumference of the casing of the first unit battery with respect to a center of a lower surface of the casing. The interconnection member may include a side portion combined with the step portion; and a bottom portion which is connected to the side portion and combined with the cap assembly of the second unit battery. Four side portions may be separated from one another at the same interval. The side portion may have a cylindrical shape which vertically extends. The casing may have a cylindrical shape.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS

Hereinafter, exemplary embodiments of the invention will be described in detail with reference to the attached drawings such that the invention can be easily put into practice by those skilled in the art. However, the invention is not limited to the embodiments described herein, but may be embodied in various forms. Elements that do not correspond to the invention will not be described in order to provide simplified description for the invention in association with the drawings. Like reference numerals denote like elements throughout the entire specification. Also, elements already well known in the art will not be described in detail.

A rechargeable battery generally includes an electrode assembly having a positive electrode, a negative electrode, and a separator interposed therebetween, a casing providing a space for storing the electrode assembly, and a cap plate combined with the casing to seal the electrode assembly. Each of the positive and negative electrodes includes a coated portion where an activation material is coated and an uncoated portion where the activation material is not coated. The uncoated portion is provided to collect the current generated in the positive and negative electrodes, and a conductive tap is attached thereto. The conductive tap induces the current generated in the positive and negative electrodes to the positive and negative terminals, respectively. The rechargeable battery may be manufactured in a variety of shapes such as cylindrical, rectangular, and pouch types depending on the shapes of the electrode assembly and the casing.

A battery module having a plurality of rechargeable batteries as described above is being widely used as a power supply for driving motors of portable miniaturized electronic devices such as mobile phones, personal computers, and camcorders, and hybrid electric vehicles. The unit batteries of the battery module are interconnected to one another using an interconnection member or coupler. For example, when a battery module is constructed by interconnecting cylindrical rechargeable batteries, the interconnection member is provided to grip outside of the battery unit. Such connecting structure may increase outer diameter of the battery module. To avoid the increase of the outer diameter of the module, the rechargeable battery unit with a small diameter may be used. Such small sized battery unit may not provide sufficient output power. Thus, a compact battery module is desired without any substantial reduction of output power.

Figure 1:
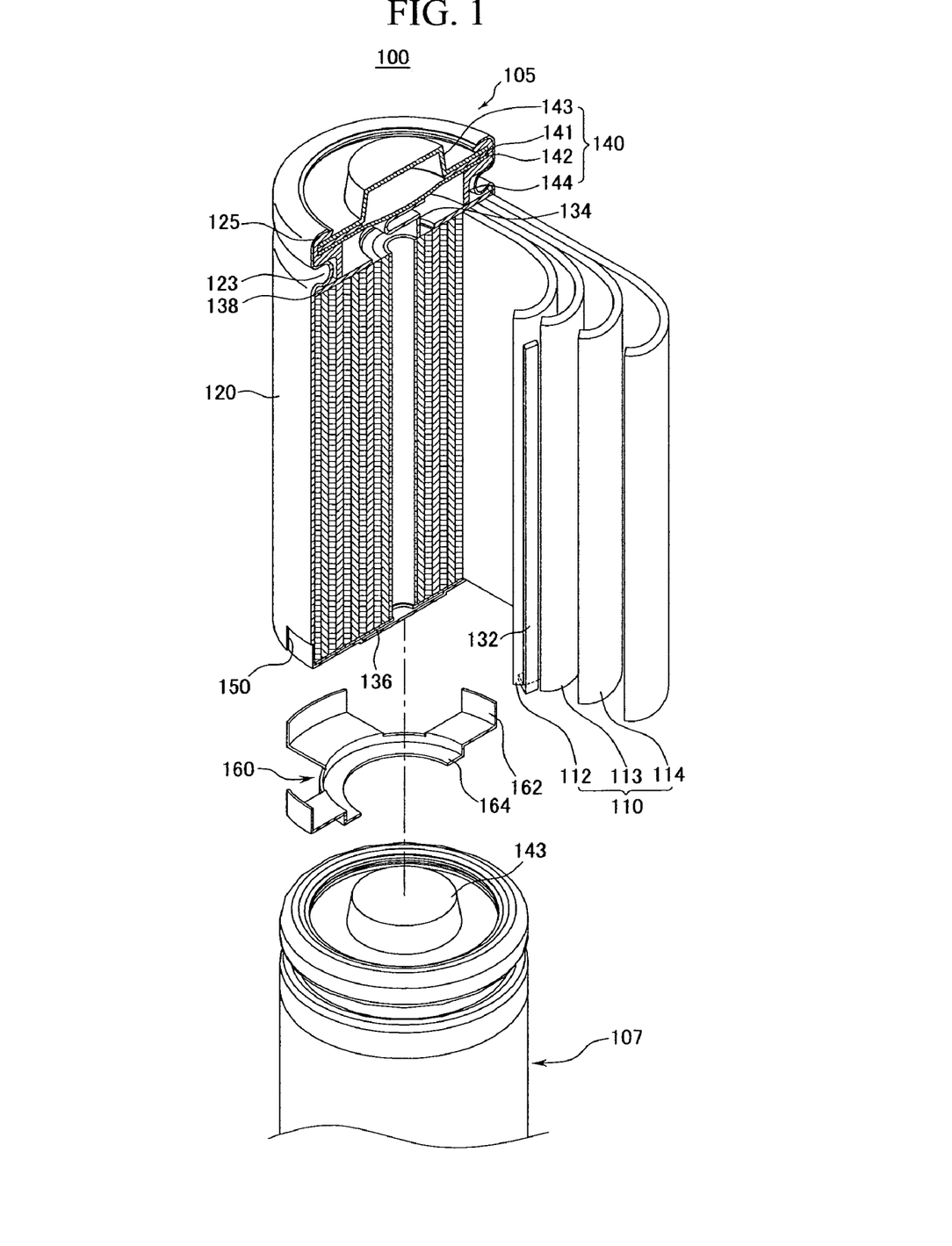
FIG. 1 is an exploded cross-sectional perspective view illustrating a battery module according to an embodiment of the invention.
Figure 2:
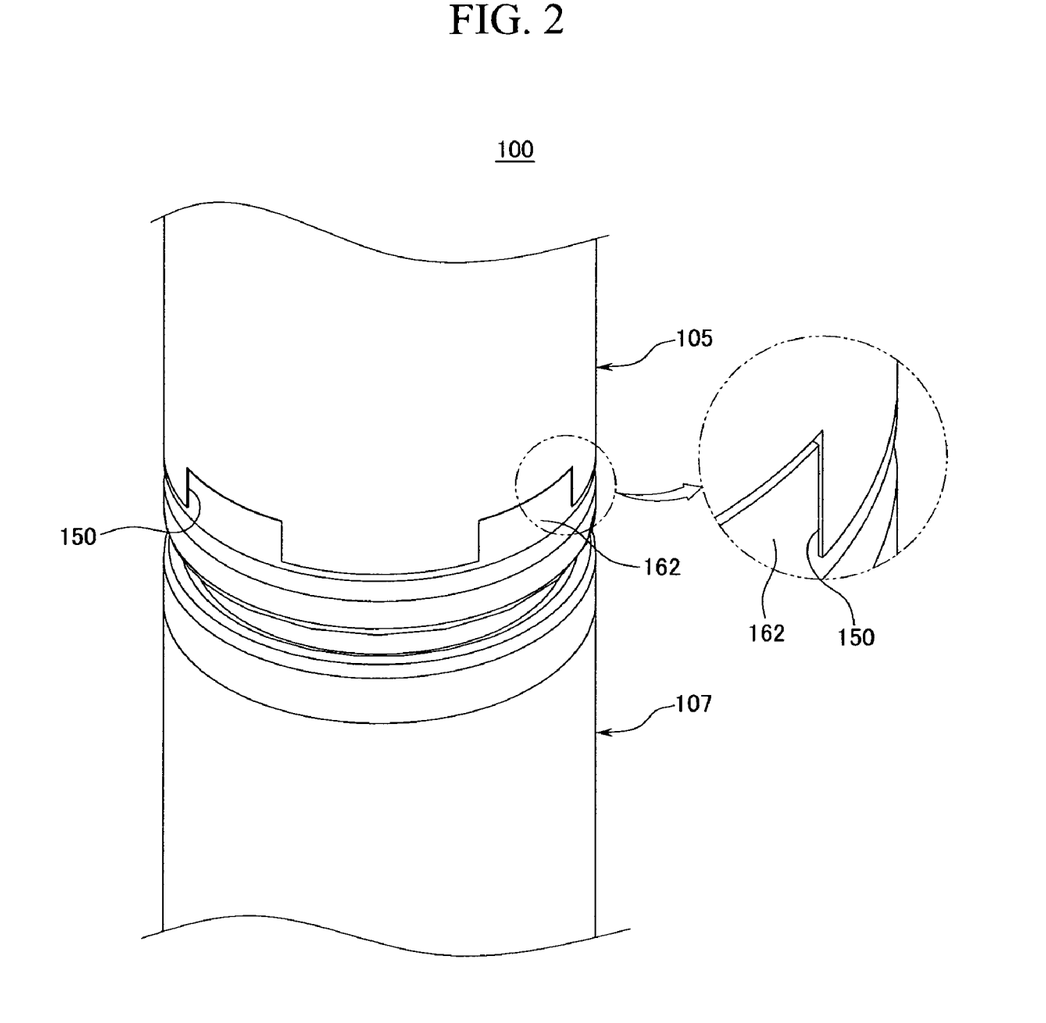
FIG. 2 is an assembled perspective view illustrating a battery module shown in FIG. 1.

FIG. 1 is an exploded cross-sectional perspective view illustrating a battery module according to an embodiment of the invention, and FIG. 2 is an assembled perspective view illustrating a battery module shown in FIG. 1. According to the illustrated embodiment, first and second unit batteries or battery units 105 and 107 constructed of lithium ion rechargeable batteries are included in the battery module 100. However, the lithium ion rechargeable batteries are just an example, but may be exchanged with other kinds of batteries. In addition, the battery module according to an embodiment of the invention may be constructed of two or more unit batteries, and these are also included in the scope of the invention.

Referring to FIGS. 1 and 2, the battery module 100 includes first and second unit batteries 105 and 107, each of which includes a battery assembly 110, a casing 120, a cap assembly 140, and a center pin (not shown), and an interconnection member 160. Since the first and second unit batteries 105 and 107 have the same structure, the components of the unit battery which will be described below can be similarly applied to both of the first and second unit batteries 105 and 107. The electrode assembly 110 includes a negative electrode 112 formed by attaching a negative activation material onto a charge collector, a positive electrode 114 formed by attaching a positive activation material onto a charge collector, and a separator 113 interposed between the positive and negative electrodes 114 and 112 to prevent a short-circuit therebetween.

More specifically, the negative electrode 112 is manufactured by coating a slurry type activation material layer obtained by mixing a negative activation material powder, a negative binder, a bond, and the like on a charge collector such as a copper plate. In this case, the negative activation material may include a carbon material selected from a group consisting of natural graphite, artificial graphite, graphited carbon, non-graphited carbon, and a combination thereof as a main composition. In addition, a negative tap 132 is combined with the negative electrode 112 and makes contact with an internal bottom surface of the casing 120. As a result, the casing 120 can function as a negative electrode. In certain embodiments, it would be apparent to those skilled in the art that a negative charge collector (not shown) may be connected to the negative electrode 112 instead of the negative electrode tap 132.

The positive electrode 114 is manufactured by coating a slurry type activation material layer obtained by mixing a positive activation material powder, a positive binder, a positive conductive additive, and the like on a charge collector such as an aluminum plate. The positive activation material may include a lithium metal oxide selected from a group consisting of $LiCoO_2$, $LiMnO_2$, $LiNiO_2$, $LiCrO_2$, and $LiMn_2O_4$. A positive tap 134 is combined with the positive electrode 114, extracted from the positive electrode 114, and then connected to a safety vent 142 of the cap assembly 140. In certain embodiments, a positive charge collector (not shown) may be connected to the positive electrode 114 instead of the positive electrode tap 134. In this case, the lead tap (not shown) of the positive charge collector may be connected to the cap assembly 140.

The separator 113 separates the positive and negative electrodes 112 and 114 from each other, and provides a circulation path for the lithium ions. In an embodiment, the separator 113 may be a single layered film formed of polyethylene, polypropylene, or polyvinylidene fluoride, a multi-layered film having two or more layers formed thereof. In another embodiment, the separator 113 may be a mixed multi-layered film such as a polyethylene/polypropylene double layered separator, a polyethylene/polypropylene/polyethylene triple layered film, and a polypropylene/polyethylene/polypropylene triple layered separator.

The electrode assembly 110 may be obtained by sequentially stacking the negative electrode, the separator 113, and the positive electrode 114, combining a center rod (not shown) with the end of the stack, and winding them in a cylindrical shape. The obtained electrode assembly 110 may be inserted into a casing 120, which will be described later, and then, the center rod 110 may be separated from the electrode assembly 110. A vacant space generated by separating the center rod may be filled with a center pin (not shown). The center pin is to prevent electrode assembly deformation which can be generated during the charge/discharge operations of the rechargeable batteries 100, and may have a cylindrical shape to fit into the vacant space. Such a center pin may be formed of metal such as iron, copper, nickel, and nickel alloy, or polymer. Meanwhile, upper and lower insulation plates 138 and 136 are installed on upper and lower sides, respectively, of the aforementioned electrode assembly 110 in order to prevent an unnecessary electrical short between the electrode assembly 110 and the casing 120.

The casing 120 includes an internal space for storing the electrode assembly 110 in a cylindrical shape. The casing 120 has an opened top face, into which the electrode assembly 110 can be inserted. The casing 120 also includes a bead portion 123 and a crimped portion 125 in order to fix the cap assembly 140 and the electrode assembly 110 positioned in its internal space. The internal space of the sealed casing 120 is filled with electrolyte (not shown), which allows the lithium ions generated by an electrochemical response to move between the positive and negative electrodes 112 and 114 during the charge/discharge operations. Meanwhile, a stepped receiving portion or a recess is formed around a lower circumference of the casing 120, which will be described in detail below.

In certain embodiments, the cap assembly 140 includes an electrode cap 143, a positive temperature coefficient element 141, a safety vent 142, and a gasket 144, and is installed on top of the opened casing 120 to seal it. The gasket 144 covers side surfaces of the conductive electrode cap 143, the positive temperature coefficient element 141, and the safety vent 142 to insulate them from the casing 120. The safety vent 142 has a lower surface where a positive electrode tap 134 extracted from the positive electrode 114 is attached using a bonding process such as welding. The safety vent 142 is upwardly switched to cut off electrical connection with the positive electrode 114 when the internal pressure of the rechargeable battery 100 exceeds a predetermined value. Although the safety vent 142 and the positive electrode tap 134 are directly connected to each other in the illustrated embodiment, it would be apparent to those skilled in the art that an insulation member (not shown) and a cap plate (not shown) may be further sequentially stacked under the safety vent 142, and the positive electrode tap 134 may be combined with the cap plate.

The positive temperature coefficient element 141 is electrically and mechanically connected to an upper portion of the safety vent 142. The electrical resistance of the positive temperature coefficient element 141 increases to a nearly infinite level when its temperature increases over a predetermined level. Therefore, it can be used to stop a charge/discharge current flow when the temperature of the rechargeable battery 100 increases over a predetermined level. When the temperature of the rechargeable battery 100 is decreased under a predetermined level, the electrical resistance of the positive temperature coefficient element 141 is reduced again. Accordingly, the function of the rechargeable battery 100 can be recovered.

The rechargeable battery 100 according to in an embodiment may further include a separate safety means in addition to the aforementioned safety vent 142 and the positive temperature coefficient element 141 in order to prevent abnormal conditions caused by an excessive charge/discharge operation, a significantly high temperature, an overflow current, and the like. The electrode cap 143 is connected to an upper portion of the positive temperature coefficient element 141 to externally apply the current.

Hereinafter, the aforementioned casing 120 will be described in more detail. A receiving portion is formed in a lower side surface of the casing 120. According to an embodiment, the receiving portion includes four receiving grooves or recesses 150. A distance between neighboring receiving grooves 150 is identical for all receiving grooves 150. Although four receiving grooves or recesses 150 are provided in the illustrated embodiment, the number of receiving grooves 150 may change. The distance between the neighboring receiving grooves 150 may also change in a design stage. In addition, when a battery module 100 is constructed of a pair of first and second unit batteries 150 and 107, the receiving groove 150 may be formed in only the casing 120 of the first unit battery 105 where the interconnection member 160 is installed, in certain embodiments.

The interconnection member 160 includes a side portion or peripheral portion 162 and a bottom portion or central portion 164 for electrically interconnecting the first and second unit batteries 105 and 107 having the aforementioned components. The side portion 162 is fixed to the receiving groove 150 formed in the lower side surface of the casing 120 of the first unit battery 105, and the bottom portion 164 integrally connected to the side portion 162 is fixed to the electrode cap 143 of the second unit battery 107. Although the interconnection member 160 may be fixed using various methods, welding is used in an embodiment. The welding may include resistance welding, laser welding, and the like.

Although the battery module 100 according to the above discussed embodiments includes a pair of unit batteries 105 and 107, it would be apparent to those skilled in the art that the battery module 100 may include three or more unit batteries. In this case, the number of necessary interconnection members 160 can be calculated by subtracting one from the number of the unit batteries.

Figure 3:
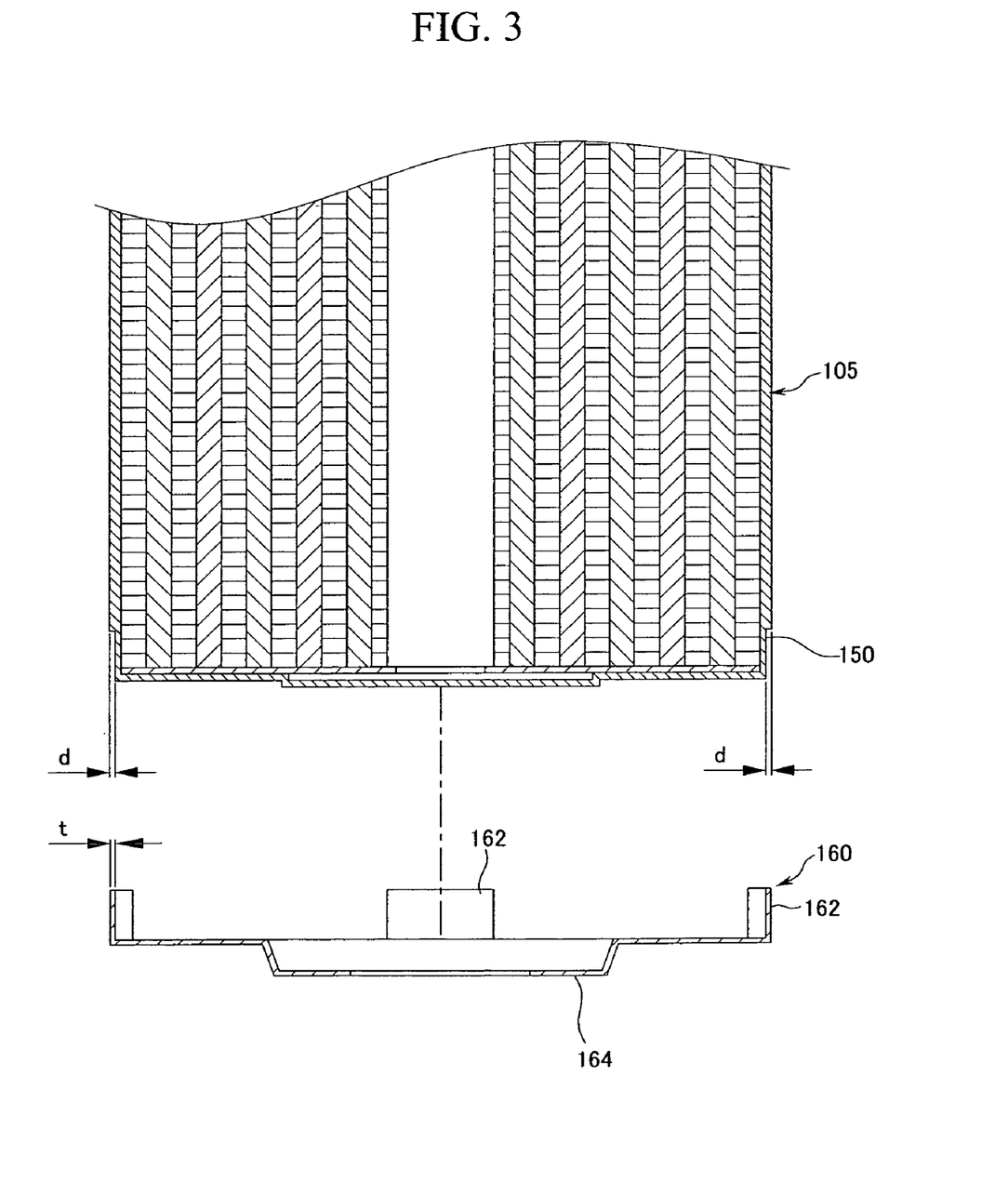
FIG. 3 is a cross-sectional view illustrating a state in which a first unit battery and an interconnection member shown in FIGS. 1 and 2 are disassembled.

Hereinafter, the receiving groove 150 and the interconnection member 160 will be described in more detail with reference to FIGS. 3 and 4. FIG. 3 is a cross-sectional view illustrating a state in which the first unit battery 105 and the interconnection member 160 shown in FIGS. 1 and 2 are disassembled. Referring to FIG. 3, the receiving groove 150 formed in the first unit battery 105 has a predetermined depth d. In this case, the depth of the receiving groove 150 is determined such that the output power of the battery module 100 is not reduced. In addition, the depth d of the receiving groove 150 is preferably equal to or larger than the thickness t of the side portion 162 of the interconnection member 160.

Figure 4:
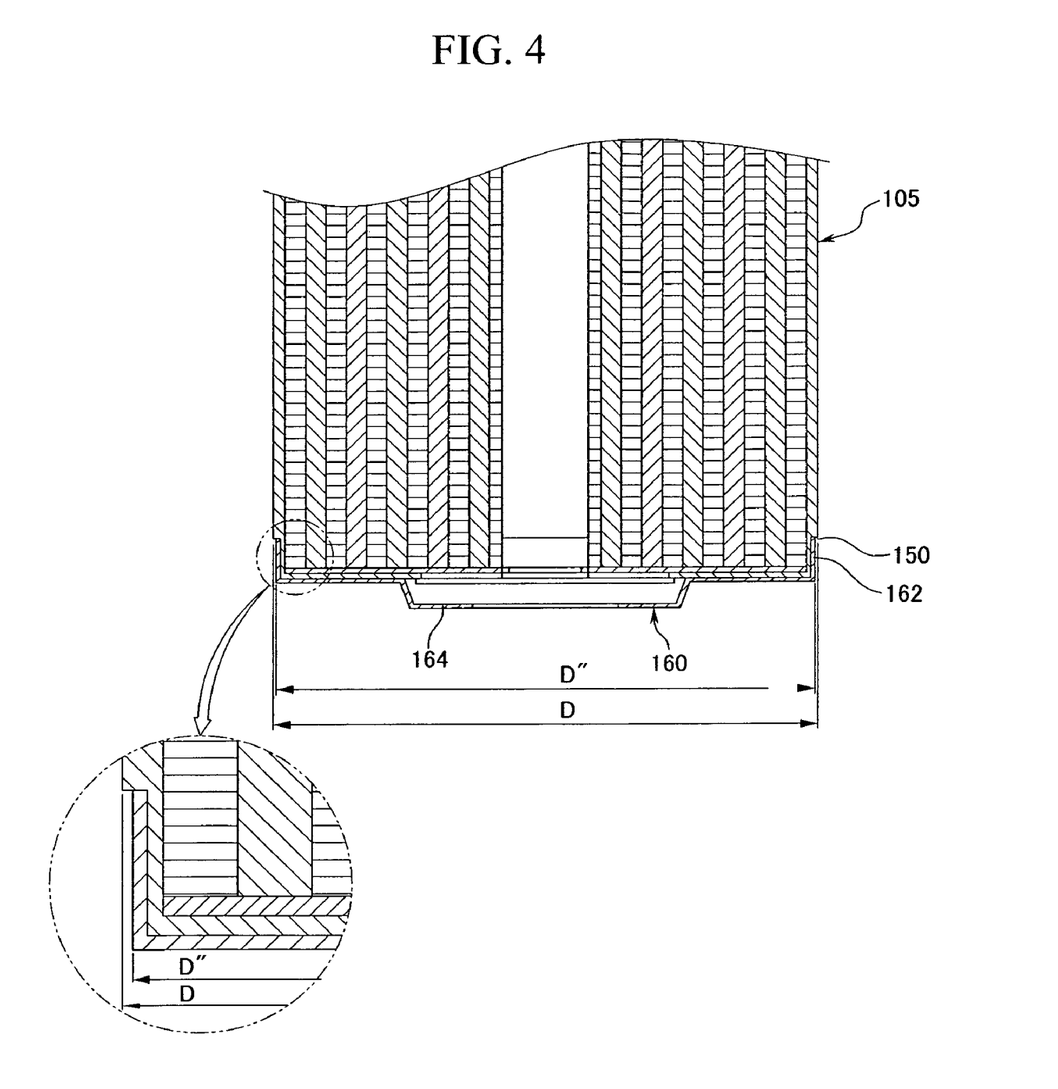
FIG. 4 is a cross-sectional view illustrating a state in which an interconnection member and a first unit battery shown in FIG. 3 are assembled.

FIG. 4 is a cross-sectional view illustrating a state in which the first unit battery 105 and the interconnection member 160 shown in FIG. 3 are assembled. Referring to FIG. 4, the maximum diameter D of the interconnection member 160 combined with the receiving groove 150 is not larger than the maximum diameter D of the first unit battery 105. Finally, according to the discussed embodiments, it is possible to avoid of increase of the size of the battery module.

Figure 5:
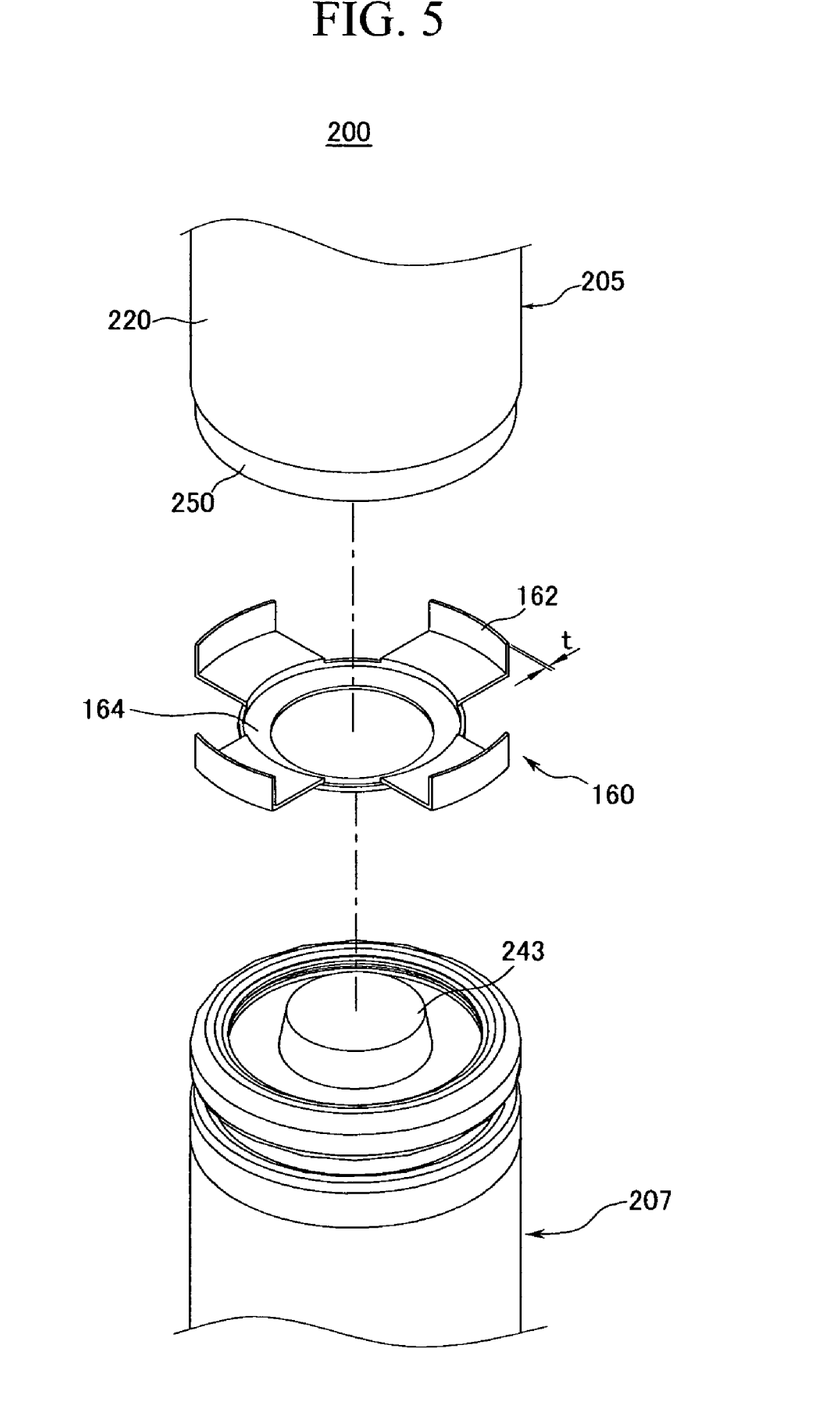
FIG. 5 is an exploded perspective view illustrating a battery module according to an embodiment of the invention.
Figure 6:
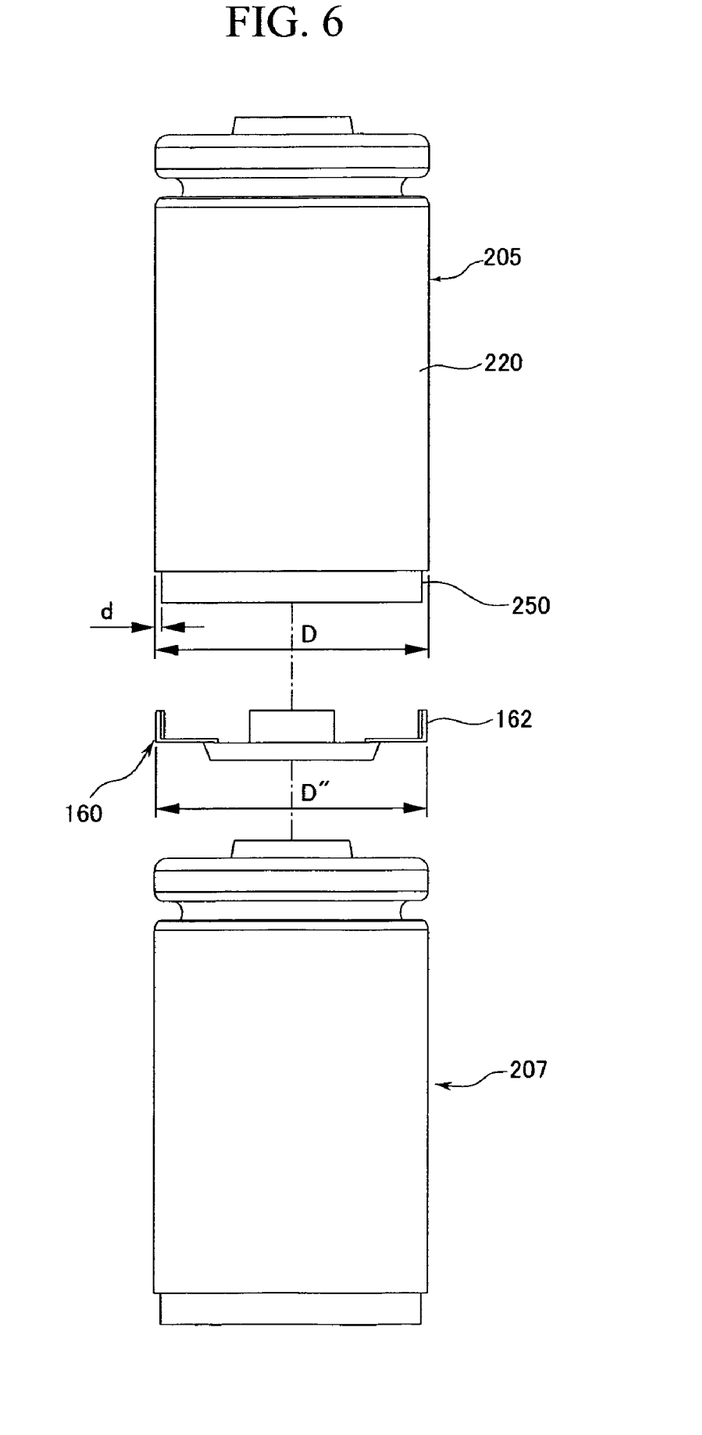
FIG. 6 is a front view of FIG. 5.

FIG. 5 is an exploded perspective view illustrating a battery module 200 according to an embodiment of the present invention, and FIG. 6 is a front view of FIG. 5. Referring to FIGS. 5 and 6, the battery module 200 includes a first unit battery 205, an interconnection member 160, and a second unit battery 207. A step portion 250 is formed in the lower circumference of the first unit battery 205. The step portion 250 is formed by making a step in a radius direction along the lower side circumference of the casing 220 with respect to the center of the lower surface of the casing 220 or edge which the end surface and side surface meet. And the side portion 162 of the interconnection member 160 is bonded stepped portion using a bonding process such as welding. The depth d of the step portion 150 is preferably equal to or larger than the thickness t of the side portion 162 of the interconnection member 160. In addition, the maximum diameter D" of the interconnection member 160 is equal to or smaller than the maximum diameter D of the first unit battery 105. According to the illustrated embodiment, the side portion 162 of the interconnection member 160 is engaged with the step portion 250. Therefore, even when the interconnection member 160 is included in the battery module, the size of the battery module 200 is not increased.

Figure 7:
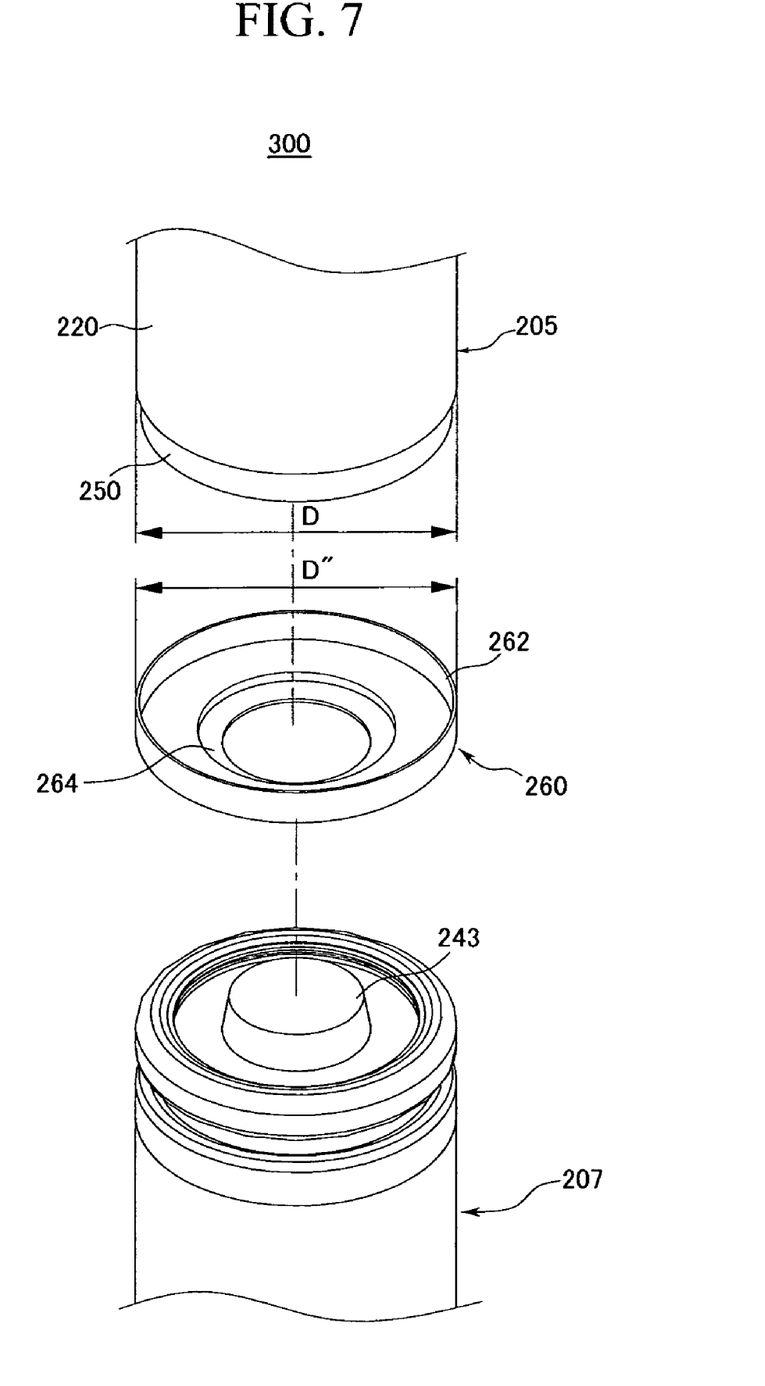
FIG. 7 is an exploded perspective view illustrating a battery module according to an embodiment of the invention.

FIG. 7 is an exploded perspective view illustrating a battery module 300 according to an embodiment of the invention. Referring to FIG. 7, the battery module 300 includes a first unit battery 205, an interconnection member 260, and a second unit battery 207. The interconnection member 260 includes a side portion or peripheral rim 262 and a bottom portion 264, and electrically interconnects the first and second unit batteries 205 and 207 with each other. The side portion 262 has a cylindrical shape which vertically extends, and the entire inner surface of the side portion 262 makes contact with and is fixed to the step portion 250 provided along the lower side circumference of the casing 220 of the first unit battery 105. In addition, the bottom portion 264 integrally connected to the side portion 262 is fixed to the electrode cap 243 of the second unit battery 207. In this case, a part of the inner surface of the side portion 262 may make contact with and is fixed to the step portion 250.

The interconnection member 260 is fixed to the step portion 250 and the electrode cap 243 using a welding process such as resistance welding and laser welding. In addition, the maximum diameter D" of the interconnection member 260 is equal to or smaller than the maximum diameter D of the first unit battery 205. According to the illustrated embodiment of the invention, since the step portion 250 is engaged with the side portion 262 of the interconnection member 260, the size of the battery module 300 is not increased even when the interconnection member 260 is included in the battery module 300.

According to embodiments of the invention, since the side portion of the interconnection member is safely engaged with the receiving portion of the casing, it is possible to reduce the maximum diameter of the battery module without substantial reduction the output power of the battery module. In addition, the battery module according to embodiments of the invention can output higher power in comparison with a conventional battery module having the same maximum diameter. Furthermore, the battery module according to embodiments of the invention is advantageous to design a compact battery module and an effective cooling system for cooling the battery module, which may allow cooling air to flow along the side surfaces of the batteries without significant resistance of the interconnection member in embodiments of the invention.

Although the exemplary embodiments of the invention have been described, the invention is not limited to the embodiments, but may be modified in various forms without departing from the scope of the appended claims, the detailed description, and the accompanying drawings. Therefore, it is natural that such modifications belong to the scope of the invention.

What is claimed is:

1. A battery module comprising:
   a first battery unit comprising a first end, a second end and a side surface interconnecting the first and second ends therebetween, the side surface comprising an electrically conductive recess in the vicinity of the second end;
   a second battery unit comprising a first end, a second end and a side surface interconnecting the first and second ends of the second battery therebetween, wherein the first and second battery units are arranged such that the second end of the first battery unit faces the second battery unit; and an electrically conductive coupler comprising a central portion and a peripheral portion, the central portion interposed between the first and second battery units, the peripheral portion physically and electrically contacting the electrically conductive recess such that the coupler receives a portion of the first battery unit near the second end thereof.

2. The battery module of claim 1, wherein the recess comprises an inwardly retracted portion of the side surface of the first battery unit.

3. The battery module of claim 2, wherein the second end of the first battery unit comprises a second end surface, and wherein the inwardly retracted portion of the side surface abuts the second end surface.

4. The battery module of claim 2, wherein the second end of the first battery unit comprises a second end surface, wherein the first battery unit further comprises an interconnecting surface interconnecting the second end surface and the side surface of the first battery unit, and wherein the inwardly retracted portion is connected to the second end surface via the interconnecting surface.

5. The battery module of claim 1, wherein the second end and the side surface of the first battery unit define one or more edges therebetween, wherein the one or more edges form a closed loop, and wherein the recess is formed along the one or more edges.

6. The battery module of claim 1, wherein the second end and the side surface of the first battery unit define one or more edges therebetween, wherein the one or more edges form a closed loop, and wherein, the recess is in a single closed loop along the closed loop of the one or more edges.

7. The battery module of claim 1, wherein the side surface of the first battery unit comprises one or more additional recesses.

8. The battery module of claim 1, wherein the first battery unit comprises a can, which comprises the second end and the side surface, and wherein the can has a cross-sectional shape selected from the group consisting of generally a circle, an oval, a rectangle and a polygon.

9. The battery module of claim 1, wherein the first battery unit is fixed or bonded to the coupler.

10. The battery module of claim 1, wherein the central portion comprises a surface contacting the second end of the first battery unit, and wherein the peripheral portion generally extends in a direction substantially perpendicular to the surface of the central portion.

11. The battery module of claim 10, wherein the peripheral portion comprises a rim extending from the central portion in a direction substantially perpendicular to the surface of the central portion.

12. The battery module of claim 11, wherein the peripheral portion surrounds the side surface near the second end of the first battery unit.

13. The battery module of claim 1, wherein the coupler comprises one or more additional peripheral portions, and wherein each peripheral portion is integrated with the central portion via an arm.

14. The battery module of claim 13, wherein the peripheral portions generally surround the side surface near the second end of the first battery unit.

15. The battery module of claim 1, wherein the second end of the first battery unit comprises a second end surface facing the second battery unit, wherein the side surface of the first battery unit forms an outermost contour when viewed in a direction perpendicular to the second end surface, and wherein the coupler does not outwardly extend beyond the contour when viewed in the same direction.

16. The battery module of claim 15, wherein the contour is substantially circular with a radius, wherein the central portion of the coupler has a center, and wherein a distance from the center to an outermost surface of the peripheral portion in a plane perpendicular to the direction is substantially the same as or smaller than the radius.

17. An automobile comprising the battery module of claim 1.

* * * * *

UNITED STATES PATENT AND TRADEMARK OFFICE
CERTIFICATE OF CORRECTION

PATENT NO.         : 7,611,800 B2
APPLICATION NO.    : 11/699543
DATED              : November 3, 2009
INVENTOR(S)        : Tae-Yong Kim It is certified that error appears in the above-identified patent and that said Letters Patent is hereby corrected as shown below:

At Column 9, line 34 claim 6, please delete "wherein,", and insert --wherein--, therefore.

Signed and Sealed this
Twenty-fourth Day of April, 2012

David J. Kappos
*Director of the United States Patent and Trademark Office*

UNITED STATES PATENT AND TRADEMARK OFFICE
CERTIFICATE OF CORRECTION

PATENT NO. : 7,611,800 B2  
APPLICATION NO. : 11/699543  
DATED : November 3, 2009  
INVENTOR(S) : Tae-Yong Kim Page 1 of 1

It is certified that error appears in the above-identified patent and that said Letters Patent is hereby corrected as shown below:

On the title page, item [73] should read: "Samsung SDI Co., Ltd."

Signed and Sealed this  
Nineteenth Day of March, 2013

Teresa Stanek Rea  
*Acting Director of the United States Patent and Trademark Office*